United States Patent
Subramanian et al.

(10) Patent No.: US 12,287,773 B2
(45) Date of Patent: Apr. 29, 2025

(54) SYSTEMS AND METHODS FOR VALIDATING NON-HOMOGENEOUS ASSETS THAT COMPRISE NON-STANDARDIZED DATA DESCRIPTIONS USING DYNAMICALLY GENERATED VALIDATION RULES

(71) Applicant: Capital One Services, LLC, McLean, VA (US)

(72) Inventors: Singaram Subramanian, Dublin, CA (US); Christian Lemler, Livermore, CA (US); Saket Hatwar, San Mateo, CA (US); Adwait Suresh Talathi, Kensington, CA (US); Sumod Soman, San Ramon, CA (US); Michael Lom, San Francisco, CA (US); Mariam Rajabi, McLean, VA (US); Snehal Patil, San Ramon, CA (US); Heena Patel, Fremont, CA (US); John Prout, Castro Valley, CA (US); David Thompson, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/171,008

(22) Filed: Feb. 17, 2023

(65) Prior Publication Data
US 2024/0281429 A1    Aug. 22, 2024

(51) Int. Cl.
*G06F 16/23* (2019.01)
*G06F 16/21* (2019.01)

(52) U.S. Cl.
CPC ........ *G06F 16/2365* (2019.01); *G06F 16/212* (2019.01)

(58) Field of Classification Search
None
See application file for complete search history.

(56) References Cited

U.S. PATENT DOCUMENTS

| | | | |
|---|---|---|---|
| 11,222,026 B1* | 1/2022 | Arya | G06F 16/24534 |
| 2017/0286456 A1* | 10/2017 | Wenzel | G16H 10/20 |
| 2019/0279172 A1* | 9/2019 | Duffield | H04L 9/3239 |
| 2021/0241241 A1* | 8/2021 | Lokanath | G06Q 20/065 |
| 2023/0267122 A1* | 8/2023 | Subramanian | G06F 16/2471 |
| | | | 707/769 |

* cited by examiner

*Primary Examiner* — Irene Baker
(74) *Attorney, Agent, or Firm* — Foley & Lardner LLP

(57) ABSTRACT

Systems and methods use dynamically generated validation rules. These validation rules comprise a first validation rule portion that is generated using a standardized validation process (e.g., corresponding to a standardized schema) and a second validation rule portion that is generated using a validation process selected based on a non-standardized schema that is specific to a respective asset type of the plurality of respective asset types.

20 Claims, 5 Drawing Sheets

200

210 →

| Data Attribute | Attribute Type |
|---|---|
| Asset Name | String |
| Asset Owner | String |
| Business Unit | String |
| Asset Description | String |
| Asset Unique Identifier | Integer/String |

220 →

| Data Attribute | Attribute Type |
|---|---|
| Specific Asset Type Identifier | Integer/String |
| Asset Private Data | Various |
| Asset Public Data | Various |
| Asset Function 1 | Function |
| Asset Function 2 | Function |
| Asset Function 3 | Function |
| Asset Function 4 | Function |

FIG. 2

SYSTEMS AND METHODS FOR VALIDATING NON-HOMOGENEOUS ASSETS THAT COMPRISE NON-STANDARDIZED DATA DESCRIPTIONS USING DYNAMICALLY GENERATED VALIDATION RULES

BACKGROUND

As the world increasingly moves toward the use of electronic storage as the predominant storage method, the amount and type of data in storage continues to expand. To manage this data, some systems rely on a data exchange. A data exchange may facilitate the process of sending, storing, and searching data.

SUMMARY

Data exchanges hold vast amounts of data in many different formats and platforms as well as perform other functions. For example, a data exchange may process data structured under a source schema and transform it into a target schema, so that the target data is an accurate representation of the source data. By doing so, the data exchange may allow data to be shared between different computer programs.

As a byproduct of processing the data in such a manner, data descriptions for this data are also transformed. For example, the data descriptions and/or other metadata may describe the data, its schema, and/or other information required for its use. However, whereas the data exchange may be optimized to efficiently and accurately transform data from the source schema to the target schema, the data exchange does not optimize (and is not designed to transform) the data descriptions themselves.

As such, a novel technical problem arises in validating data in a data exchange, particularly based on data descriptions. For example, the diversity of data assets and types in the data exchange led to a plethora of non-uniform and non-standardized descriptions. This novel technical problem is only exacerbated as the data descriptions and/or metadata are also transformed, not only into additional non-uniform and non-standardized descriptions, but also using non-uniform and non-standardized transformation processes. Given the vast array of descriptions (and characteristics thereof) validating this data by ensuring that the data has undergone adequate data cleansing, maintains a high level of data quality, and/or is otherwise both correct and useful is difficult. Furthermore, given that the data descriptions upon which data is validated may have changed in unexpected ways, any validation rules developed for data descriptions featuring the original data schema (or even the target schema) may be ineffective or inaccurate. Because of these technical challenges, conventional systems have no way of applying validation rules across a data exchange, in particular a data exchange that comprises non-homogenous assets with non-standardized data descriptions.

To overcome these technical hurdles, systems and methods are described herein for validating non-homogenous assets that comprise non-standardized data descriptions. More specifically, the systems and methods accomplish this using dynamically generated validation rules. These validation rules comprise a first validation rule portion that is generated using a standardized validation process (e.g., corresponding to a standardized schema) and a second validation rule portion that is generated using a validation process selected based on a non-standardized schema that is specific to a respective asset type of the plurality of respective asset types. By doing so, these validation rules allow validation of assets in the exchange that may have both standardized and custom schemas.

In some aspects, systems and methods are described herein for validating non-homogenous assets that comprise non-standardized data descriptions using dynamically generated validation rules. For example, the system may receive, from a first user, a request to access a data exchange, wherein the data exchange comprises a plurality of assets with a plurality of respective asset types, wherein each of the plurality of asset types comprises a first set of attributes and a second set of attributes, wherein the first set of attributes each comprise a standardized schema, and wherein the second set of attributes each comprise a schema specific to a respective asset type of the plurality of respective asset types. The system may receive, from the first user, a first validation request for a first asset of the plurality of assets. The system may determine a first validation rule for validating the data exchange, wherein the first validation rule comprises a first validation rule portion that is generated using a standardized validation process for the first set of attributes and a second validation rule portion that is generated using a validation process selected based on the second set of attributes. The system may perform, based on the standardized schema, a first validation by applying the first validation rule portion to the respective first set of attributes for the plurality of asset types. The system may perform, based on a schema specific to the respective asset type of the plurality of asset types, a second validation by applying the second validation rule portion to a respective second set of attributes for the plurality of asset types. The system may generate for display, on a user interface, a result for the first validation request based on the first validation and the second validation.

Additionally or alternatively, another novel technical problem arises in validating data in a data exchange, particularly based on data descriptions that include non-homogenous assets with non-standardized data descriptions. In particular, once the data descriptions are created, the non-standardization of these data descriptions creates a technical hurdle in running command strings (e.g., in furtherance of validation) on the data descriptions as the non-standardized data descriptions may create technical problems in the command strings executing properly on the non-standardized portions.

To overcome this technical problem, systems and methods are described herein for executing operations across data exchanges that comprise non-homogenous assets and non-standardized data descriptions. More specifically, the systems and methods accomplish this by generating command strings that include portions for both the standardized and custom schemas. For example, the system may determine a first validation rule portion that is generated using a standardized process (e.g., corresponding to a standardized schema) and a second command portion that is generated using a process selected based on a non-standardized schema that is specific to a respective asset type of the plurality of respective asset types. By doing so, these command strings allow for commands to be executed across assets in the exchange that may have both standardized and custom schemas.

In some aspects, systems and methods are described herein for executing operations across data exchanges that comprise non-homogenous assets and non-standardized data descriptions. For example, the system may receive, from a first user, a request to access a data exchange, wherein the data exchange comprises a plurality of asset types, wherein each of the plurality of asset types comprises a first set of attributes and a second set of attributes, wherein the first set of attributes each comprise a standardized schema, and wherein the second set of attributes each comprise a schema specific to a respective asset type of the plurality of asset types. The system may receive, from a first user, a first operation for applying to assets in the data exchange. The system may generate a first command string based on the first operation, wherein the first command string identifies the assets upon which to perform the first operation. The system may determine a first command portion that is generated using a standardized process for the first set of attributes and a second command portion that is generated using a process selected based on the second set of attributes. The system may perform, based on the first command portion, the first operation to the respective first set of attributes of the assets. The system may perform, based on the second command portion, the first operation to the respective second set of attributes of the assets. The system may generate for display, on a user interface, a result for the first operation based on performing the first command portion and the second command portion.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise.

BRIEF DESCRIPTION OF THE DRAWINGS

FIG. 2 shows illustrative architecture for a data exchange with non-homogenous functionality and non-standardized data description, in accordance with one or more embodiments.

DETAILED DESCRIPTION OF THE DRAWINGS

Figure 1:
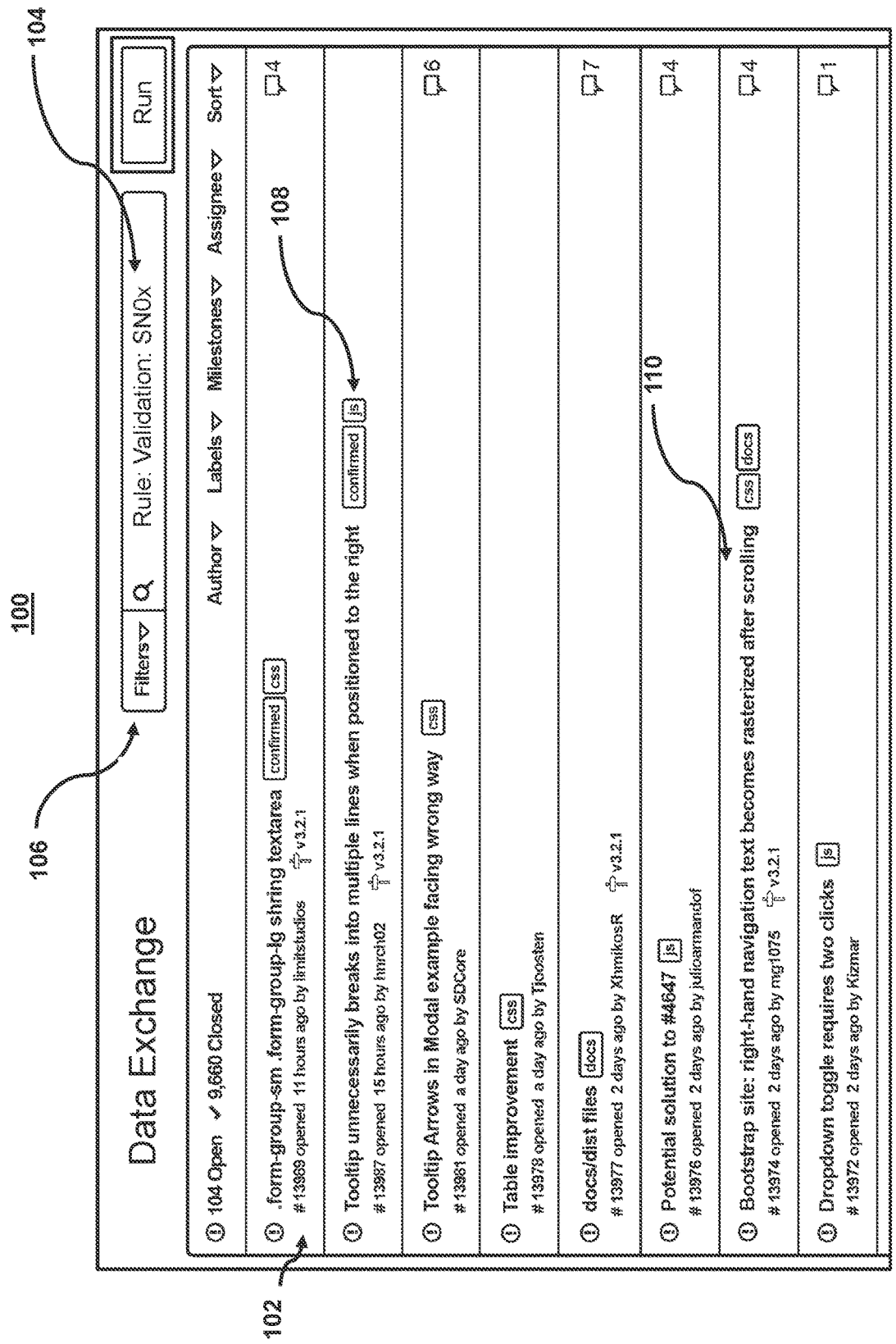
FIG. 1 shows an illustrative user interface for validating data in data exchanges, in accordance with one or more embodiments.

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

The system and methods may perform numerous operations and/or commands based on asset schemas that include standardized and customized portions. For example, whether manually or automatically configuring a schema for a type of asset (e.g., a digital asset) may include adding attributes that are standard across asset types and attributes custom to a respective asset type. Additionally or alternatively, the system may configure or determine whether operations or commands (e.g., as represented by a command string) are performed according to standardized and custom schemas. For example, a given validation rule may have operations that are specific for each standard and each custom attribute.

In some embodiments, the operations and/or commands based on asset schemas that include standardized and customized portions may be executed at runtime. For example, the system may receive a request from a user or system to create and/or edit an asset instance, perform a workflow step for the asset instance (e.g., create a new listing for a car, edit the listing, and/or approve it as a workflow step), and/or perform any other operation. In response to the request, the system may perform an operation and/or execute a command string (e.g., performing a validation) that applies to both the standardized attributes and the attributes specific to an asset type (in the asset instance created, edited, and/or progressed in workflow). For example, the use of an operation that may meet respective validation rules for both standardized and custom schemas (including validating an asset instance's metadata to ensure that it complies with the configured schema for that asset type) may increase functionality of the system as well as streamline processes, and/or increase scalability for one or more processes (e.g., indexing attributes in a search index, adding users to roles in an access control system, etc.).

For example, by allowing custom attributes and (optionally) corresponding validations to be specified for each asset type, each new asset type can take advantage of the operations (which support key business capabilities such as enabling search, role based access controls, etc.) out of the box. For example, the system may re-implement these operations for each new asset type or business initiative to ensure high-quality and consistent information that meets the specific requirements for each asset instance. For example, in one example, the system may allow a platform for single family home listings to easily add rental apartment listings and condo listings while ensuring each listing is valid (has the right types of information based on the type of listing) and high-quality (e.g. square footage for a property listing is always a positive number).

FIG. 1 shows an illustrative user interface for validating data in data exchanges, in accordance with one or more embodiments. For example, the system generates user interface 100 in response to a user request to access one or more data exchanges, such as a user selecting a data exchange icon in a software application, the user accessing a web page for one or more data exchanges, the user requesting access via a voice command, and/or other means for accessing the one or more data exchanges.

As referred to herein, a "user interface" may comprise a human-computer interaction and communication in a device, and may include display screens, keyboards, a mouse, and the appearance of a desktop. For example, a user interface may comprise a way a user interacts with an application or a website. As described herein, the application and/or website may comprise a data exchange system as described herein. The data exchange system may comprise a plurality of data exchange assets.

User interface 100 may allow users to enter information about a data exchange system and/or data exchange assets (e.g., via icon 102). For example, a data exchange asset may include any data or content added to and/or accessed by the data exchange. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user. The content may include one or more data exchange assets and/or data related to the data exchange assets such as data descriptions (e.g., description 110).

A data exchange asset may include an attribute. An attribute may include any information that describes the asset, such as a topic or category of the asset, including information used to populate an attribute for the asset and/or otherwise describe a data structure and/or model structure for a data exchange asset. For example, the attribute may indicate how an asset is indexed and/or archived in a connected graph data exchange database and/or data exchange system. For example, each data exchange asset may correspond to content and/or an attribute. For example, the attribute may provide an attribute that provides a fully semantic data model used to enable data entered into the system to be meaningfully applied across different data exchange application domain contexts (e.g., provide connections between different nodes of the connected graph data exchange database). In some embodiments, the system may include a custom attribute, which may be an attribute of a custom data structure. The custom attribute may comprise reference data as described herein.

The data exchange system may arrange and/or organize the data exchange assets into a graph-based hierarchy. For example, the system may organize the various data exchange assets into a system in which data exchange assets are organized one above the other according to function. The hierarchy may comprise a plurality of data exchange assets arranged in series and/or in parallel in which the inputs and outputs are intertwined such that information from one or more data exchange assets may be received from, and/or used by, one or more other data exchange assets.

Each data exchange asset may comprise content such as software applications, instructions, and/or other information used by a data exchange system. Each data exchange asset may also include an attribute and/or other characteristics about an asset that describes the data exchange assets and/or portions of the data exchange assets. In some embodiments, the attribute may include information populated in a data structure and/or model structure as described herein, as well as the input and/or outputs that are processed by a data exchange system and/or one or more data exchange assets. For example, the attribute may represent a fully semantic data model used to enable data entered into the system to be meaningfully applied across different data exchange application domain contexts.

In some embodiments, the system may use the content such as asset attributes (e.g., ontologies, metadata, data descriptions (e.g., description 110), and/or values associated with a category of an attribute) to organize data exchange assets into the hierarchy. The hierarchy may comprise a connected graph data exchange database as described herein. The data exchange may comprise a complex structured and/or unstructured set of information used by a computer system to enable a data exchange system. While embodiments are described herein with respect to a connected graph data exchange database, these embodiments may alternatively or additionally use a hierarchical or relational database structure to link different content (e.g., data exchange assets) within the data exchange system. For example, a hierarchical database structure may be a structure in which data is organized into a tree-like structure. For example, the data may be stored as records that are connected to one another through links. A record may be a collection of fields, with each field containing only one value (e.g., content). The type of a record may define which fields the record contains. In some embodiments, the tree structure may comprise a node-link structure in which a parent node links to child nodes, nested sets (e.g., in relational databases), radial trees, and/or other organizational systems.

As referred to herein, "reference data" includes data that maps a first attribute to the second attribute. For example, reference data may comprise a pointer, link, and/or other database cross-reference information. For example, the system may use reference data to define how first attribute keywords are mapped, the second attribute keywords, and/or how first attributes are mapped to second attributes. That is, the reference data may be used to map relationships (e.g., edges in a graph database) between data, data entity attributes, and/or other characteristics of the data. For example, in some embodiments, the reference data may comprise an edge (or data defining the edge) in a connected graph data exchange database. The reference data may further include data that connects (or links, points to, etc.) a third node corresponding to a first attribute and a fourth node corresponding to a second attribute. The reference data may then be used to generate a custom attribute for inclusion in a custom data structure.

As opposed to a simple tag annotated to an existing data structure, the generation of the custom data structure (e.g., populated with reference data indicating relationships between user profile data and existing assets) allows for searches and queries to be run directly on the custom data structure.

For example, the reference data may define the link between a given attribute in user profile data and the one or more applications, software profiles, etc., within the data exchange. Furthermore, as opposed to conventional tags, the reference data may include descriptions of both the attributes of the user profile data and the existing asset, as well as the code defining the relationship and/or providing the linking mechanism. For example, the reference data may include an identifier for the user profile, the user profile data type, the code required for defining the relationship, an identifier for the existing asset, an application type, an attribute type, etc. The system may thus run searches and queries on this data, which would not exist in conventional systems.

Each data exchange asset may comprise a component of the data exchange. For example, "components" of a data exchange may include portions of the data exchange (e.g., corresponding to one or more nodes of the connected graph data exchange database) that provide modeling for a specific domain application, address specific assets, provide a specific function, and/or are otherwise distinct from other portions of the data exchange. The components may be used to distinguish between standardized and non-standardized schema, data descriptions, etc. The various components of an asset, data exchange, command string, etc. may be based on corresponding reference data.

In some embodiments, the system may process one or more command strings. A command string may comprise one or more alphanumeric characters that cause one or more operations to be performed. For example, a command string may cause functionality such as searching an exchange, validating an asset, and/or other functionality (e.g., automatically update metadata, assets, and/or configurations). In some embodiments, a command string may be any input that triggers an operation or command. Operations and commands can be configured for execution on an asset type based on the standard and custom attributes. For example, changes to the owner information of an asset instance, if valid based on the rules configured for the asset type, may result in changes to role assignments in the Role-based Access Control ("RBAC") system (which authorizes changes to asset information) and may also result in the owner information updated in the search index. With these changes, the replaced/previous owner would lose access to make changes to the asset, the new owner will have the necessary access to make changes, and Asset information can be searched based on the new owner. In some embodiments, the system may automatically generate a command string in response to a modification of an asset, attribute, and/or other information.

In some embodiments, commands and operations may include: publishing asset information to a data store to generate analytics; generating a notification, e.g. when a particular attribute in an asset instance meets certain criteria; indexing a new (or edited) asset instance or attribute change in a search index and rendering a search experience or asset management dashboard including the new (or edited) asset instance; provisioning users and systems to roles on an asset instance based on an RBAC policy specifying roles and permissions for the asset type; generating a webhook or streaming an event for another system that needs to learn about or act on asset metadata (e.g. act on creation or editing an asset instance); logging an event to retain historical insights into asset activity, e.g. which user/system created an asset instance or edited certain metadata; indexing (e.g. in a graph) asset relationships based on relationship metadata added to an asset instance (e.g. a user follows a vehicle listing); triggering a workflow for an asset instance based on an attribute added, e.g. triggering a review process if unusual information is detected.

For example, in some embodiments, the system may perform validations and/or other data operations upon one or more of the assets. These validation rules may comprise a first validation rule portion that is generated using a standardized validation process (e.g., corresponding to a standardized schema) and a second validation rule portion that is generated using a validation process selected based on a non-standardized schema that is specific to a respective asset type of the plurality of respective asset types. By doing so, these validation rules allow validation of assets in the exchange that may have both standardized and custom schemas. In such cases, each portion may be based on a component of the data exchange.

As part of asset type's configuration, each asset type defines the metadata or schema for each asset instance belonging to that asset type. As an example, for a digital asset type modeling a vehicle, metadata may include the make and model of the vehicle, the owner of the vehicle and other types of attributes.

Validation rules are also set up as part of an asset type's configuration and they may differ for each asset type. Validation rules are helpful to ensure that the asset attributes are, for example, in the expected format and accurate so a variety of use cases such as dashboards, integrations with other applications, reports, etc. can rely on the metadata in an asset instance.

For example, validation rules are defined to verify that the attributes are in the correct data type, format, all the mandatory attributes are present, and each attribute meets certain data quality rules (e.g. the State field in an address must be a valid State). Rules can also be customized to identify the attributes that are required only at a specific stage of the asset's life cycle; to indicate identifiers/references that need to be validated with a different system of record/API (e.g., user's identifier should point to a valid user in the system of record for registered users). One or more validation rules can be associated with each attribute or a group of related attributes; the rule can be a predefined one (e.g., address fields must be in a valid format and a valid address) or a custom one. Validation rules may also be derived and updated automatically based on an available sample of values.

At runtime, when an asset is created or updated, the platform will execute the validations based on the asset type and the attributes present in the request to verify the provided asset information.

For example, the system may determine a first validation rule portion that is generated using a standardized process (e.g., corresponding to a component featuring a standardized schema) and a second command portion that is generated using a process selected based on a non-standardized schema that is specific to a respective asset type of the plurality of respective asset types (e.g., corresponding to a component featuring a non-standardized schema). By doing so, these command strings allow for commands to be executed across assets in the exchange that may have both standardized and custom schemas.

When the system receives a user request to access user interface 100, the system may access the user's credentials from a user profile associated with the user. For example, when the system receives a request from the user to access user interface 100, the system accesses the profile of the user stored in a data storage location to obtain credentials associated with the user. Credentials associated with the user may include a username, a user role, a user business unit, a list of user team memberships, a user organization, a search history associated with the user, and other similar credentials.

As referred to herein, "a user profile" and/or "user profile data" may comprise data actively and/or passively collected about a user. For example, the user profile data may comprise content generated by the user and a user characteristic for the user. User profile data may also include a user characteristic. As referred to herein, "a user characteristic" may include information about a user and/or information included in a directory of stored user settings, preferences, credentials, and information for the user. For example, a user profile may have the settings for the user's installed programs and operating system. In some embodiments, the user profile may be a visual display of personal data associated with a specific user, or a customized desktop environment. In some embodiments, the user profile may be a digital representation of a person's identity. In some embodiments, the data in the user profile may be generated based on the system actively or passively monitoring the user.

User interface 100 includes rule input 104 and may allow a user to filter through and identify new rules via option 106. Additionally or alternatively, user interface 100 may identify data assets that have been validated (e.g., via icon 108). In some embodiments, user interface 100 may also include other user interface elements, such as additional text boxes, additional fields, additional input mechanisms, and other elements. Rule input 104 receives input from a user, and the system receives the input from rule input 104. The system may then use the received input as a search string. The system may receive a manual user input to rule input 104, for example, by receiving a manual input from a user using a mouse and keyboard to select rule input 104 and entering a text string into rule input 104. In other embodiments, the system can populate rule input 104 automatically, such as populating rule input 104 with a search string in response to a user selecting a specific hyperlink or user interface element, in response to receiving a voice command from the user, or in response to receiving another form of automatic input to rule input 104.

Rule input 104 may be a selectable user interface element. When the system receives a selection to initiate the command string mechanism, the system may initiate a search of the data exchanges based on a received search string, such as a search string received by the system as input into rule input 104. In some embodiments, rule input 104 can be a manually selectable button or other similar user interface element. In some embodiments, the system may receive an automatic actuation of rule input 104, such as detecting a user actuating a particular key on a keyboard, selecting rule input 104 on a touch screen or other human-machine interface, in response to receiving a voice command from the user, and other suitable automatic actuation methods.

Option 106 can be a manually selectable input mechanism, such as a button. The system may receive an actuation of the option 106 and, in response, may generate for display a new user window or dialog box, a new view in user interface 100, a new tab in user interface 100, or another suitable graphical user interface presentation element. The newly displayed graphical user interface presentation element can include additional fields or other user interface elements. The system may receive input from the user at the additional fields or other user interface elements and modify the search based on the received input, such as limiting the search to a particular data exchange or subsection of the data exchange, limiting the search to particular types of digital assets, specifying specific business units or digital asset authors to search, and other filters or refining factors.

Icon 108 may be displayed with returned results. For example, the system may perform a validation and receive, from the data exchange, a list of results matching a command string (e.g., entered via rule input 104). The system may then provide the list of results as well as one or more instances of icon 108 (e.g., indicating the status of a validation). In some embodiments, icon 108 may display the most relevant results at the top of a list of returned results. In some embodiments, the system may receive a selection of one or more displayed results (e.g., may receive a manual selection in response to a user clicking on one of the displayed results). In response to receiving the selection of the one or more displayed results, the system may provide additional details about the selected one or more displayed results, such as asset owner, one or more pieces of asset functionality, asset data, asset type, and other additional details.

In some embodiments, user interface 100 may return a batch of results (e.g., data being validated in a batch). In some embodiments, the system may receive a plurality of content published to an application programming interface ("API") based on the result. The system may then filter the plurality of content using a first user content subscription setting for the first user. Additionally or alternatively, the system may determine, based on a batch filtering criterion, a respective relevance ranking for a plurality of content related to the result. The system may then compare the respective relevance ranking to a respective threshold relevance ranking to determine whether to publish the content.

In some embodiments, icon 108 may comprise a notification and/or a recommendation. For example, the system may provide numerous types of notifications and/or recommendations as described herein. In some embodiments, user interface 100 (or the recommendation data therein) may be presented as a status page. The status page may include summary information about a data exchange system, data exchange asset, comparison data, reference data, and recommendation data as well as issues, stakeholders, responsible contributors, etc. The status page may also include queries that may be performed as well as information about a rule, operations, and/or other validation characteristics.

FIG. 2 shows illustrative architecture for an asset record in a data exchange, in accordance with one or more embodiments. A data exchange is a service that enables users to search and access various digital assets and data associated with digital assets. For example, a data exchange may include one or more digital assets, such as digital asset 200. Digital asset 200 may represent various software interfaces that allow users to quickly access data and specific functionality associated with that data, especially in computing systems that have large amounts of data with which to work, such as data lakes. Examples of digital assets can include APIs, data workflows, data protocols, software applications, and other suitable software interfaces.

Each digital asset has a unique asset type associated with the digital asset. For example, even though two digital assets may both be APIs or data protocols, the digital assets may access completely different data and perform completely different functionality, such as an API for accessing weather data and an API for accessing location data. These two assets would have two different and unique asset types, even if both assets are APIs. A data exchange may contain a plurality of different asset types, each digital asset type having its own functionality.

Each digital asset 200 includes two sets of attributes. First set of attributes 210 is a standardized schema that is universal to all types of digital assets. A schema is a formal definition of the structure of stored data in a database. A schema can include data attributes, data types of attributes, fields, data formats for each attribute or field, relationships between data, and other properties that provide structure or functionality to data stored in a database. The standardized schema is a schema that is associated with every type of digital asset created and stored in the data exchange. For example, every digital asset, regardless of if the asset is an API, a data workflow, a data protocol, or other software interface, may include a standard set of data attributes such as asset name, asset owner, asset business unit, asset identifier, and other suitable attributes, along with a data type of each of the data attributes. For example, an asset name data attribute may have a data type of string, while an asset identifier data attribute may have a data type of integer, string, hash code, or another data type that can be used to create a unique identifier for the data attribute. In some embodiments, the data type of each data attribute may be a mixed data type (e.g., both a string and integer) or may accept multiple data types for the data attribute.

The standardized schema may also define a data format for each data attribute. For example, for an asset business unit data attribute, the data format may be "BUSINESS UNIT NAME-BUSINESS UNIT ID NUMBER." When a new digital asset is created, the system may prompt a creator of the new digital asset for this information and receive a user input indicating the name of the business unit associated with the new digital asset and an identification number associated with the business unit associated with the new digital asset.

The standardized schema may also define one or more relationships between data attributes or relationships between the digital asset and one or more other data objects. Relationships between data attributes may govern what values can be used to populate a data attribute based on the value of a different data attribute, what data attributes are publicly accessible or not publicly accessible based on the value of a particular data attribute, what data formats may be available for particular attributes based on the value of a different data attribute, and other similar functionality. For example, if a digital asset has an asset creator data attribute with the value "John Smith," a relationship between the asset creator data attribute and an asset business unit data attribute may require that the asset business unit data attribute must have a value of a business unit John Smith works in, such as "software applications." This information may be obtained by the system from a separate database, such as a database storing information about employees in a company utilizing a data exchange.

Relationships between the digital asset and one or more other data objects may govern a number of data objects that can access data managed by the digital asset, types of data objects that can access data managed by the digital asset, required values of attributes of data objects that request to access the data managed by the digital asset, and other similar functionality. For example, a relationship between the digital asset and another data object may require that the other data object have a value of an asset business number attribute the same value as a value of the asset business number attribute of the digital asset before allowing access to the digital asset. The system receives the request to access the digital asset from the other data object, determines if the other data object can access the digital asset, and allows or denies access based on the comparison.

Second set of attributes 220 includes a schema specific to that unique asset type. Like the standardized schema described above, the specific schema provides a formal definition for the structure of the data. However, the system receives a manual definition of the specific schema from the user for the asset type that is being created. The specific schema may include data attributes, data types of attributes, fields, data formats for each attribute or field, relationships between data, and other properties that provide structure or functionality to data stored in a database for the unique asset type. In contrast to the standardized schema that is universal to all asset types, the specific schema is defined by the creator and includes unique data attributes and functionality associated with the digital asset type. For example, a digital asset for accessing and using weather data may have a specific schema with data attributes such as requested location for weather data, requested timeframe for weather data, requested type(s) of weather data, and other weather data-specific data attributes. The specific schema may also define the functionality of the digital asset, such as providing requestor functions for requesting weather data for a particular location, timeframe, and similar parameters.

As described above, these unique properties of the specific schema are defined by a creator of the digital asset during the creation process and are not shared between all asset types. Instead, these properties are unique to the asset type being created. By defining a specific schema for each asset type, creators of assets may create custom, non-homogenous functionality for each asset type while maintaining a shared set of common attributes (the standardized schema), which aid in searching the data exchange for different asset types.

The system receives a request to create a new digital asset from the user. In some embodiments, the request may include values and functionality defined by the user for the new digital asset, such as values for data attributes of the standardized schema, values for data attributes of the specific schema and functionality associated with the specific schema, and the like. In some embodiments, the system may generate for presentation an asset creation user interface. The user may input values for data attributes of the standardized schema into fields of the asset creation user interface. The user may also input the specific schema and associated data attributes and functionality into the asset creation user interface. For example, the user may input the asset name and asset business unit into fields of the asset creation user interface and then use one or more input mechanisms to select data attributes, data types of the data attributes, functionality for the asset, values for the data attributes, and other properties of the digital asset. The system may then receive the user inputs and generate a new digital asset for storage in a data exchange based on the user inputs.

The system may distinguish between the sets of attributes when performing one or more data validations. For example, in some embodiments, the system may perform validations and/or other data operations upon one or more of the assets. These validation rules may comprise a first validation rule portion that is generated using a standardized validation process (e.g., corresponding to a first set of attributes 210) and a second validation rule portion that is generated using a validation process selected based on a non-standardized schema that is specific to a respective asset type of the plurality of respective asset types (e.g., the second set of attributes 220). By doing so, these validation rules allow validation of assets in the exchange that may have both standardized and custom schemas. In such cases, each portion may be based on a component of the data exchange.

For example, the system may determine a first validation rule portion that is generated using a standardized process (e.g., corresponding to a first set of attributes 210) and a second command portion that is generated using a process selected based on a non-standardized schema (e.g., corresponding to second set of attributes 220). By doing so, these command strings allow for commands to be executed across assets in the exchange that may have both standardized and custom schemas.

In some embodiments, the system customizes the search string based on the credentials of the users and the asset types the user is likely to be searching for. For example, the system may determine which attributes should be searched based on the first credentials as well as adjusting a portion of an inputted search string based on a likely intent of the user. Moreover, as opposed to conventional searching techniques, the system may parse a search input (e.g., an alphanumeric text string representing search criteria) generated based on search strings (e.g., corresponding different keywords, menu selections, filter criteria, etc.) into individual portions based on whether or not a portion of the search input corresponds to asset descriptions that are standardized throughout the data exchange. The identified portions of the search input may then be modified and/or formatted based on whether or not the portions correspond to asset types with standardized schemas to tailor the search to the likely intent of the user.

For each asset type, a schema (e.g., a JSON schema) is registered to define the structure (e.g., names, types, formats, attribute-level schemas (if needed), validations, and the like) of custom attributes stored/managed by the data exchange. An asset-type's schema defines custom attributes (values and data) and a format for the custom attributes for use in a variety of functions of the data exchange, such as search functionality (e.g., an asset instance (at runtime) may have a custom attribute (e.g., field, data structure) that is assigned/has/contains values and data). Using the registered asset-type schema, custom attributes of assets can be selected for indexing for search functionality of the data exchange. For example, a configuration can be defined for the data exchange to specify how the custom attributes in an asset type's schema are mapped to the search index. Examples of various configurations can include which custom attributes are indexed, aggregating values from multiple fields into a single search field, transforming or enriching the values of certain field values, crawling for & indexing additional content useful for search based on the links in the value of a custom attribute, and customizing the weightage for fields to tune the relevance of search results.

The asset-type schema and the search configuration registered for an asset type are loaded into memory for faster processing of asset management requests. When an asset instance of a given asset type is created or updated, the structure of custom attributes are validated against the registered asset-type schema to ensure that the data remains consistent across asset instances of that type. In addition, the rules in the asset-type search configuration are applied when adding the asset instance's data to the search index.

One example of a rule is a rule that transforms the asset instance's data structure when adding it to the search index. For example, an asset schema can have two fields, A and B, and one search rule in the configuration specifies that the values of A and B be combined or aggregated and mapped to a field, C, for indexing. Users can then use the name of the field, C (e.g., in an advanced query), to search for exact or partial matches to the values of A and B.

Figure 3:
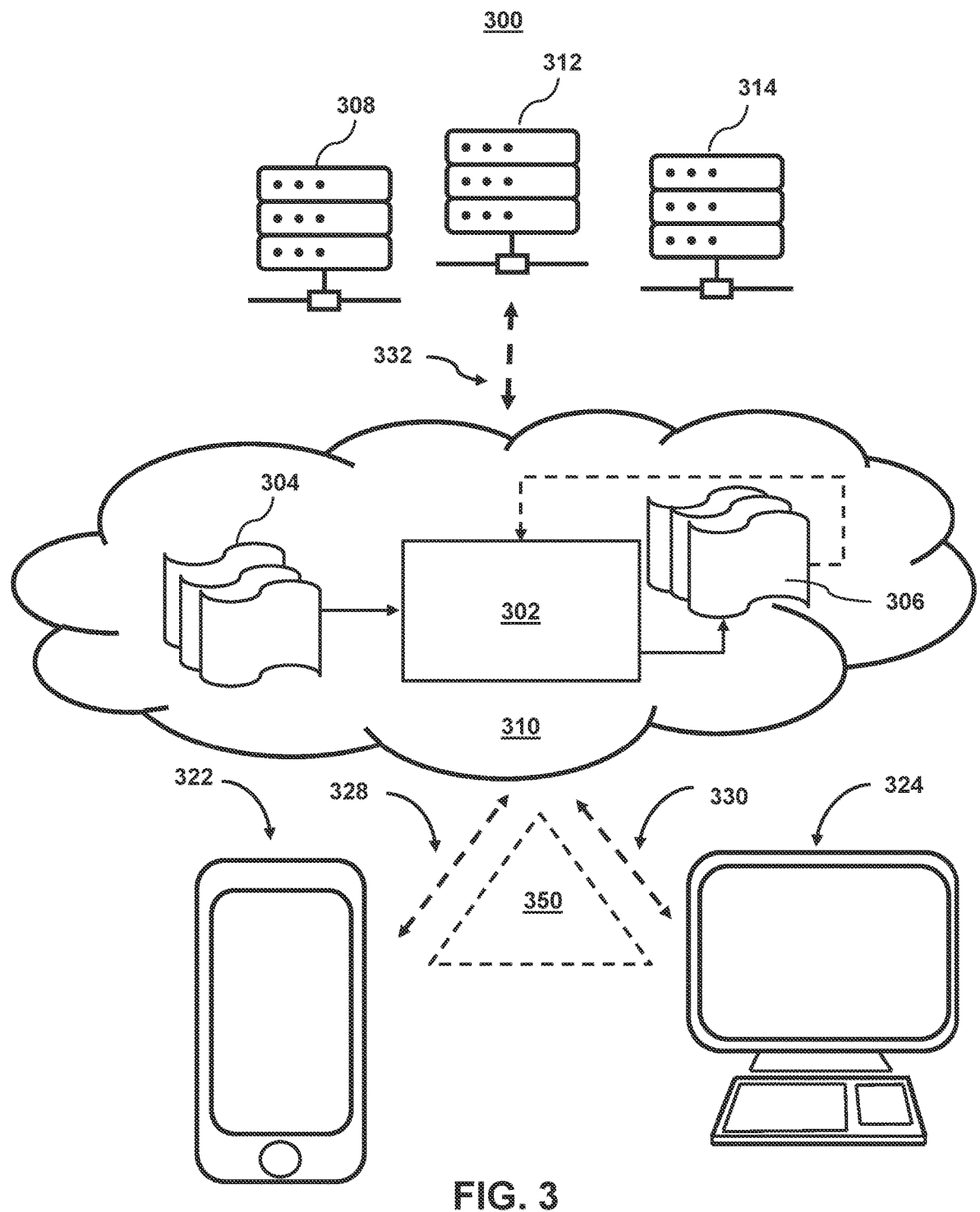
FIG. 3 shows illustrative system components for a data exchange, in accordance with one or more embodiments.

FIG. 3 shows illustrative system components for a data exchange, in accordance with one or more embodiments. For example, the system may represent the components used for searching a data exchange, as shown in FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted that while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., data related to a validation or other content).

Additionally, as mobile device 322 and user terminal 324 are shown as touchscreen smartphones, these displays also act as user input interfaces. It should be noted that in some embodiments, the devices may have neither user input interface nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to validating a data exchange.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior interactions, both actively and passively. For example, the user data may describe one or more characteristics of a user, a user device, one or more search queries input by the user, one or more digital assets owned by or associated with the user, one or more digital assets previously accessed by the user, or other information related to the user's access of the data exchange. Alternatively, or additionally, the system may act as a clearing house for multiple sources of information about the user. This information may be compiled into a user profile. Cloud components 310 may also include control circuitry configured to perform the various operations needed to generate alternative content. For example, the cloud components 310 may include cloud-based storage circuitry configured to generate alternative content. Cloud components 310 may also include cloud-based control circuitry configured to run processes to determine alternative content. Cloud components 310 may also include cloud-based I/O circuitry configured to display alternative content.

Cloud components 310 may include model 302, which may be a machine learning model (e.g., as described in FIG. 3). Model 302 may take inputs 304 and provide outputs 306. The inputs may include multiple datasets, such as a training dataset and a test dataset. Each of the plurality of datasets (e.g., inputs 304) may include data subsets related to user data, predicted intents, and/or actual intents. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

Cloud components 310 may include first data source 308, second data source 312, and crowdsourced database 314. First data source 308 may correspond to a data source of a first entity (e.g., a first crowdsourced user). First data source 308 may have a first native data structure and/or first attribute. The first native data structure and/or first attribute may correspond to a software architecture, data flow, threat, and/or mitigation technique corresponding to a first contribution. Second data source 312 may correspond to a data source of a second entity (e.g., a second crowdsourced user). Second data source 312 may have a second native data structure and/or second attribute. The second native data structure and/or second attribute may correspond to a software architecture, data flow, threat, and/or mitigation technique corresponding to a second contribution. Crowdsourced database 314 may correspond to a crowdsourced database housing the data exchange system, which may be distinct from the first and second entities. Crowdsourced database 314 may have a native hierarchical data structure (e.g., a connected graph data exchange database) and/or native attribute. Furthermore, the system may use machine learning to generate a hierarchical data structure for crowdsourced database 314 based on first data source 308 and second data source 312 even though first data source 308 and second data source 312 may feature different attributes.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, model 302 may predict one or more search terms. Search terms may include one or more words, phrases, values, or other portions of search strings that are used in a search process. For example, the system may determine that particular characteristics are more likely to be indicative of a particular validation rule for a given schema (standardized or non-standardized). In some embodiments, the model (e.g., model 302) may automatically perform actions based on outputs 306. In some embodiments, the model (e.g., model 302) may not perform any actions. The output of the model (e.g., model 302) may be used to generate for display, on a user interface, a recommendation of dynamically generated validation rules.

System 300 also includes API layer 350. API layer 350 may allow the system to generate recommendations across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of the API layer 350 may provide integration between front end and back end. In such cases, API layer 350 may use RESTful APIs (exposition to front end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
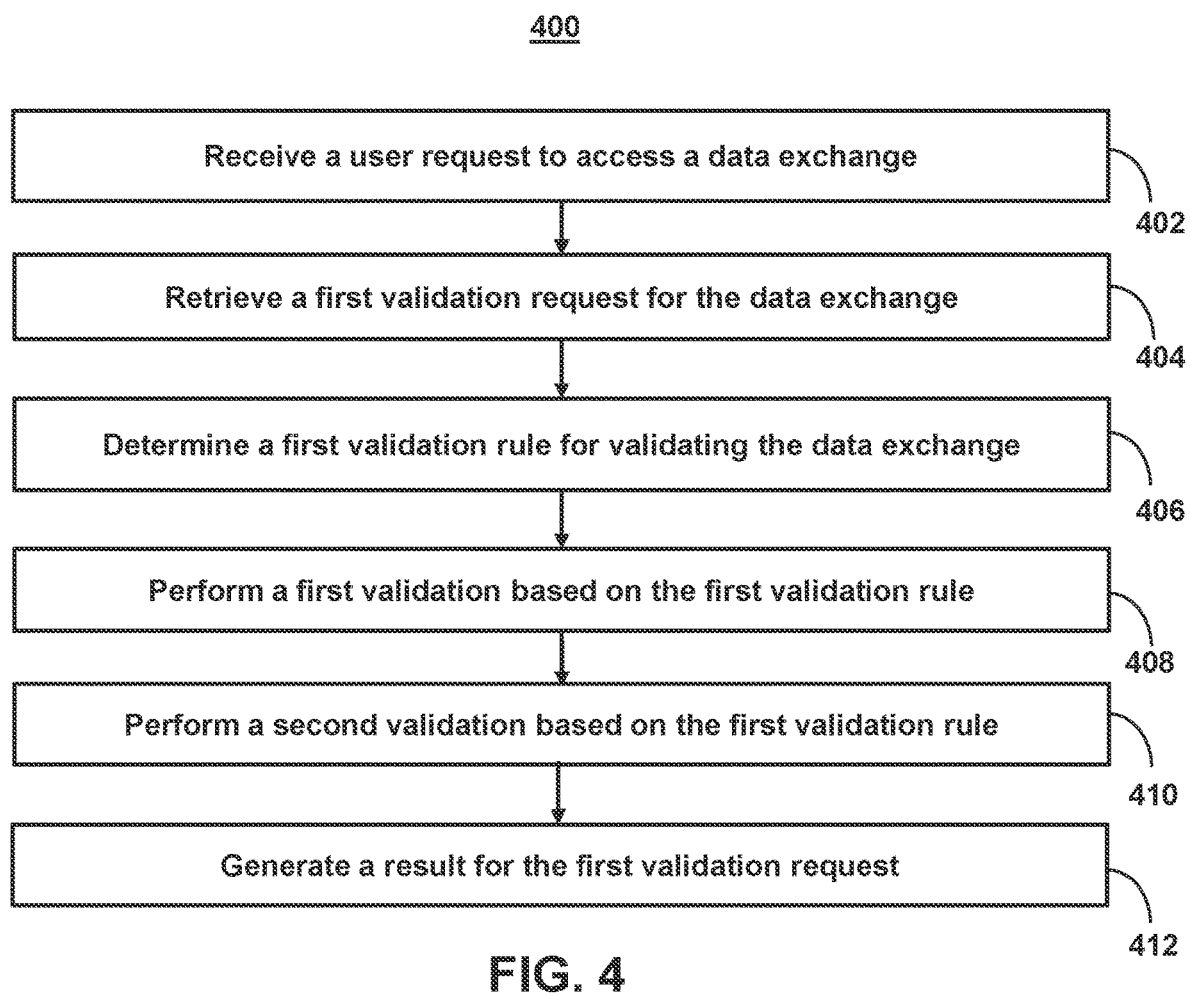
FIG. 4 shows a flowchart of the steps involved in dynamically generated validation rules, in accordance with one or more embodiments.

FIG. 4 shows a flowchart of the steps for validating data exchanges for information on assets, in accordance with one or more embodiments. The system may use process 400 (e.g., as implemented on one or more system components) in order to validate data in one or more data exchanges for relevant digital assets such as data exchanges comprising information on digital assets with non-homogenous functionality and non-standardized data descriptions. Each of the assets may comprise a plurality of asset types, each of the plurality of asset types comprising a first set of attributes and a second set of attributes. The first set of attributes comprise a standardized schema shared by all asset types, and the second set of attributes comprise a schema specific to a respective asset type of the plurality of asset types.

At step 402, process 400 (e.g., as implemented on one or more system components as described in FIG. 3) receives a user request to access a data exchange. For example, the system may receive, from a first user, a request to access a data exchange, wherein the data exchange comprises a plurality of assets with a plurality of respective asset types, wherein each of the plurality of asset types comprises a first set of attributes and a second set of attributes, wherein the first set of attributes each comprise a standardized schema, and wherein the second set of attributes each comprise a schema specific to a respective asset type of the plurality of respective asset types. In some embodiments, the request may include additional validation parameters for validating the data exchange and may include a user identity, a user credential, a type of asset to search, a particular data exchange asset to validate, or other parameters.

In some embodiments, the system may determine additional information about a user or user request when receiving the first operations. For example, the system may determine a first authorization level for a first user. The system may then compare the first authorization level to a database listing authorization levels corresponding to each of a plurality of operation types to determine whether to generate the first command string. In another example, the system may determine a first role for the first user based on a first credential. The system may compare the first role to a database listing roles corresponding to each of a plurality of operation types to determine whether to generate the first command string.

At step 404, process 400 (e.g., as implemented on one or more system components as described in FIG. 3) retrieves a first validation request for the data exchange. For example, the system may receive, from the first user, a first validation request for a first asset of the plurality of assets. In some embodiments, the system may determine a first set of attributes for performing the first validation based on the second set of attributes. The system may then determine a second set of attributes for performing the second validation based on the second set of attributes. For example, the system may determine a first attribute set identifier based on the second set of attributes. The system may then compare the first attribute set identifier to a database listing attribute sets corresponding to the first attribute set identifier to determine the first set of attributes for performing the first validation.

In some embodiments, the system accesses the user profile based on a credential associated with a requesting user or based on an identity of the requesting user. The system uses the received credential or identity to access a profile stored in memory associated with the user. Process 400 may then access one or more credentials associated with the user, such as a username, a user business unit, a user team, or another suitable credential. In some embodiments, the system may determine a user role. As described below with regard to step 408, the user role may be compared to a database listing roles likely to access each of the plurality of asset types to filter the plurality of asset types based on the user role. In some embodiments, the system accesses the user profile based on a credential associated with a requesting user or based on an identity of the requesting user. The system uses the received credential or identity to access a profile stored in memory associated with the user. Process 400 may then access one or more credentials associated with the user, such as a username, a user business unit, a user team, or another suitable credential. In some embodiments, the system may determine a user role. As described below with regard to step 408, the user role may be compared to a database listing roles likely to access each of the plurality of asset types to filter the plurality of asset types based on the user role.

In some embodiments, the system may use the one or more credentials to determine a user authorization level. Like the user role, the user authorization level may be compared to a database listing authorization levels corresponding to each of the plurality of asset types to filter the plurality of asset types based on the authorization. In some embodiments, the system may use the one or more credentials to determine one or more attributes to validate. For example, certain user credentials may modify the validation to only validate within a business unit associated with the user, a team associated with the user, an organization associated with the user, and other modifications for a search.

In some embodiments, the system may use the one or more credentials to determine an asset terminology identifier that is associated with the user. For example, if a user is associated with a particular business unit or a particular organization, the user may use certain terminology while another user in a different business unit or organization may use different terminology. Based on the credential, the system may modify the validation or filter the validation rule creation to use a set of asset terminology terms and phrases. Based on the set of asset terminology, the system may select digital assets as results with familiar terminologies to the user or attributes of digital assets that include the asset terminology the user is most likely to be familiar with. The system may input the asset terminology identifier into a database listing terminology for users with the credential corresponding to attributes for the plurality of asset types to determine a modification to an existing validation rule.

At step 406, process 400 (e.g., as implemented on one or more system components as described in FIG. 3) determines a first validation rule for validating the data exchange. For example, the system may determine a first validation rule for validating the data exchange, wherein the first validation rule comprises a first validation rule portion that is generated using a standardized validation process for the first set of attributes and a second validation rule portion that is generated using a validation process selected based on the second set of attributes. In some embodiments, the user may manually input a command string into a user interface, and the system receives the command string from the user interface. In other embodiments, the system may receive the command string based on a selection of a link by the user, a voice command stated by the user, and other automatic input methods.

For example, the system may determine a first data type for the schema specific to a first asset type of the plurality of asset types. The system may format the second validation rule portion based on the first data type to generate a first formatted validation rule portion. The system may compare the first formatted validation rule portion to a first value of a first attribute of the second set of attributes for the first asset type. The system may determine a second data type for the schema specific to a second asset type of the plurality of asset types. The system may format the second validation rule portion based on the second data type to generate a second formatted validation rule portion. The system may compare the second formatted validation rule portion to a first value of a second attribute of the second set of attributes for the second asset type.

At step 408, process 400 (e.g., as implemented on one or more system components as described in FIG. 3) performs a first validation based on the first validation rule. For example, the system may perform, based on the standardized schema, a first validation by applying the first validation rule portion to a respective first set of attributes for the plurality of asset types. The system may perform the first comparison by comparing the first validation rule portion to the first set of attributes. The system performs the first comparison based on the standardized schema for all digital assets. The first comparison includes a comparison of the first validation rule portion to a first set of attributes for the plurality of asset types. In some embodiments, the first set of attributes includes the standardized schema of attributes that is shared among all digital asset types stored in the data exchange. Values of the first attributes from at least a portion of the digital assets stored in the data exchange are compared to the first validation rule portion to determine if a particular asset of the stored digital assets is a relevant validation rule for the attributes.

In some embodiments, the validation rule may comprise one or more words, phrases, values, or other search terms for validating the data exchange. In some embodiments, the system determines the input based on a command string and the user credential. The command string includes a first validation rule portion and a second validation rule portion. The system generates the first validation rule portion based on the standardized schema and using a standardized process applicable to all asset types and all user credential types. For example, the system may generate the first validation rule portion using the standardized process for all asset types and user credentials. The first validation rule portion is used to aid in validating the data exchange for relevant results based on properties associated with the standardized schema associated with every asset type stored in the data exchange. For example, the first validation rule portion can include one or more validation rules and/or terms. The system may generate the second validation rule portion using a process specific to the determined user credential, such as generating the second validation rule based on a user business unit, a user role, a user authorization level, and other user-specific credentials.

In some embodiments, the validation rule may be further determined based on an output of a model. For example, the system may provide the validation rule to a model for predicting validation rules based on schemas. The model may process the validation rule to predict one or more rules and/or terms that may return the most relevant results (e.g., perform the best validation). The model may then output the predicted rules and/or terms for use by the system in generating a validation rule. In some embodiments, the model may also access the user profile to determine one or more characteristics about the user, such as username, user business unit, user search history, and other characteristics. The model may process the user characteristics and output relevant rules and/or terms for use in generating the validation rule.

In some embodiments, the process used to generate the second validation rule portion includes determining a respective asset type identifier for each of the plurality of asset types stored in the data exchange. The system may input the respective asset type identifier into a database listing schemas corresponding to asset type identifiers to determine a respective set of database objects for each of the plurality of asset types. The schema may include these database objects, which are a unique combination of objects for the asset type.

In some embodiments, the process used to generate the second validation rule portion further includes determining a modification to the second validation rule portion based on the respective set of database objects and applying the modification to the second validation rule portion prior to the second comparison. The system may make modifications to the second validation rule portion based on the database objects associated with a particular schema, which aids in identifying assets the user is most likely validating for.

At step 410, process 400 (e.g., as implemented on one or more system components as described in FIG. 3) performs a second validation based on the first validation rule. For example, the system may perform, based on a schema specific to the respective asset type of the plurality of asset types, a second validation by applying the second validation rule portion to a respective second set of attributes for the plurality of asset types. In some embodiments, the first set of attributes includes the standardized schema of attributes that is shared among all digital asset types stored in the data exchange. Values of the first attributes from at least a portion of the digital assets stored in the data exchange are compared to the first validation rule portion to determine if a particular asset of the stored digital assets is a relevant search result for the search request.

The system may perform the second comparison by comparing the second validation rule portion to a second set of attributes. The system performs the second comparison on a schema specific to a respective asset type of the plurality of asset types. The second comparison includes a comparison of the second validation rule portion to a respective second set of attributes for the plurality of asset types. For example, based on the user-specific credential, one or more values from a set of attributes specific to each asset type may be compared to the second input portion to determine if a particular asset has unique or specific attributes that may be a match for the user's search.

In some embodiments, the second comparison may include determining a data type for the schema specific to an asset type of the plurality of asset types and formatting the second validation rule portion based on the first data type to generate a first formatted validation rule portion. Data types may include strings, integers, Booleans, enumerated data, and other data types. The first formatted validation rule portion may be compared to a first value of a first attribute of the second set of attributes for the first asset type. The second comparison may also include determining a second data type for the schema specific to a second asset type of the plurality of asset types, formatting the second validation rule portion based on the second data type to generate a second formatted validation rule portion, and comparing the second formatted validation rule portion to a first value of a second attribute of the second set of attributes for the second asset type. In this way, the second validation rule portion may be uniquely formatted for each given asset type in the data exchange.

In some embodiments, different attributes may be selected for the first set of attributes and the second set of attributes based on the credential. For example, the system may determine which attributes are included in the first and second sets based on the credentials of the user. For example, a first set of attributes may be the same for all software programmers, but the attributes in this first set may be different from the attributes in the first set for the cybersecurity team.

The system may perform the operation based on characteristics of the attributes and/or schema. In some embodiments, the system may select an algorithm based on the schema specific for processing the attributes. For example, the system may select a first algorithm based on the schema specific to the respective asset type of the plurality of asset types and the first operation. The system may then process each of the respective second set of attributes for the plurality of asset types using the first algorithm.

Additionally or alternatively, the system may determine a first data type for the schema specific to a first asset type of the plurality of asset types. The system may then format the second command portion based on the first data type to generate a first formatted command portion. The system may then compare the first formatted command portion to a first value of a first attribute of the second set of attributes for the first asset type. The system may then determine a second data type for the schema specific to a second asset type of the plurality of asset types. The system may then format the second command portion based on the second data type to generate a second formatted command portion. The system may then compare the second formatted command portion to a first value of a second attribute of the second set of attributes for the second asset type.

At step 412, process 400 (e.g., as implemented on one or more system components as described in FIG. 3) generates a result for the first validation request. For example, the system may generate for display, on a user interface, a result for the first validation request based on the first validation and the second validation. The system may generate the validation result for display to the user. The system may generate the validation results based on the first comparison and the second comparison. When the system generates the search results a list of validation results is generated and returned by the system. In some embodiments, the system returns the validation results to a user interface for display to the user. In other embodiments, the system returns the validation result to a separate computing system. In some embodiments, the system may prioritize or rank individual validation results of the generated validation results based on the first comparison and the second comparison. For example, the system may determine a relevancy score for each individual validation result based on the first comparison, the second comparison, or both the first comparison and the second comparison. The relevancy score may indicate how relevant to the validation rule or the command string corresponding to the individual validation result it is. For example, the system may determine a relevancy score between 0 and 100, where relevancy scores closer to 0 indicate less relevant validation results and relevancy scores closer to 100 indicate more relevant validation results. The system may then determine a ranking or listing of the validation results based on the relevancy scores of each individual search result, such as ranking the list in order from the most relevant search result to the least relevant search result. In other embodiments, the system may compare the relevancy score to a threshold relevancy score. For example, a threshold relevancy score may be 75. If the relevancy scores of individual validation results exceed the threshold relevancy score (e.g., exceed a value of 75), the individual validation result associated with the relevancy score can be included in the list of validation results. If the relevancy score of the individual validation result does not exceed the threshold relevancy score, the individual validation result will not be included in the returned validation results.

In some embodiments, the system may receive a plurality of content published to an API" based on the result. The system may then filter the plurality of content using a first user content subscription setting for the first user. Additionally or alternatively, the system may determine, based on a batch filtering criterion, a respective relevance ranking for a plurality of content related to the result. The system may then compare the respective relevance ranking to a respective threshold relevance ranking to determine whether to publish the content.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 4.

Figure 5:
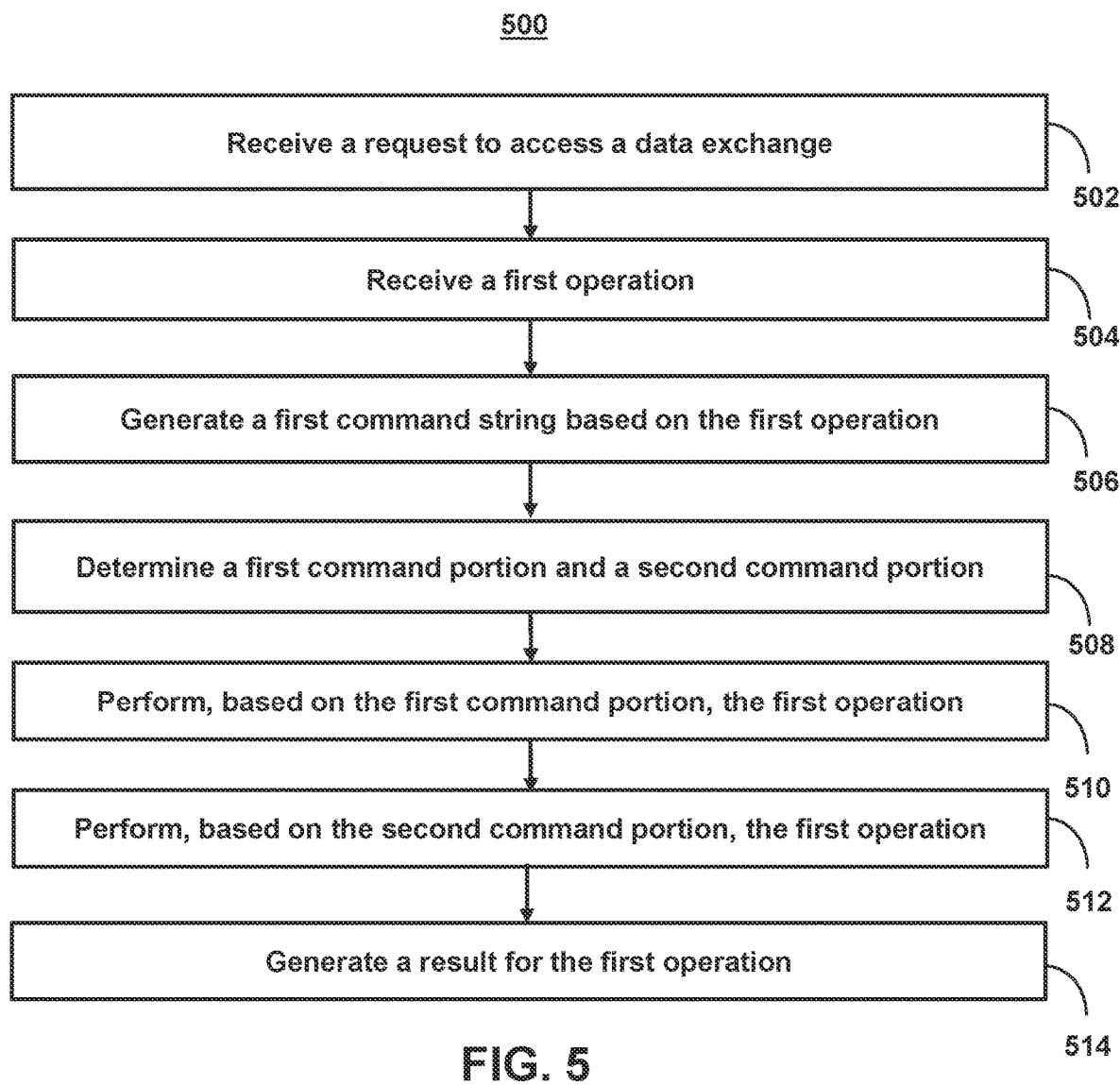
FIG. 5 shows a flowchart of the steps involved in executing operations across data exchanges, in accordance with one or more embodiments.

FIG. 5 shows a flowchart of the steps involved in executing operations across data exchanges, in accordance with one or more embodiments. The system may use process 500 (e.g., as implemented on one or more system components) in order to execute data validation operations across data exchanges that comprise non-homogenous assets and non-standardized data descriptions. For example, each of the assets may comprise a plurality of asset types, each of the plurality of asset types comprising a first set of attributes and a second set of attributes. The first set of attributes comprises a standardized schema shared by all asset types, and the second set of attributes comprises a schema specific to a respective asset type of the plurality of asset types.

At step 502, process 500 (e.g., as implemented on one or more system components as described in FIG. 3) receives a request to access a data exchange. For example, the system may receive, from a first user, a request to access a data exchange, wherein the data exchange comprises a plurality of asset types, wherein each of the plurality of asset types comprises a first set of attributes and a second set of attributes, wherein the first set of attributes each comprises a standardized schema, and wherein the second set of attributes each comprises a schema specific to a respective asset type of the plurality of asset types.

At step 504, process 500 (e.g., as implemented on one or more system components as described in FIG. 3) receives a first operation. For example, the system may receive, from a first user, a first operation for applying to assets in the data exchange. For example, the first operation may comprise validation of metadata corresponding to the assets.

In some embodiments, the system may determine additional information about a user or user request when receiving the first operations. For example, the system may determine a first authorization level for a first user. The system may then compare the first authorization level to a database listing authorization levels corresponding to each of a plurality of operation types to determine whether to generate the first command string. In another example, the system may determine a first role for a first user based on a first credential. The system may compare the first role to a database listing roles corresponding to each of a plurality of operation types to determine whether to generate the first command string.

At step 506, process 500 (e.g., as implemented on one or more system components as described in FIG. 3) generates a first command string based on the first operation. For example, the system may generate a first command string based on the first operation, wherein the first command string identifies the assets upon which to perform the first operation.

In some embodiments, the system may determine a command string based on the attributes. For example, the system may determine a first set of attributes for performing the first operation based on the first command string. The system may then determine a second set of attributes for performing the first operation based on the first command string. For example, the system may determine a first attribute set identifier based on the first command string. The system may then compare the first attribute set identifier to a database listing attribute sets corresponding to the first attribute set identifier to determine the first set of attributes for performing the first command string.

At step 508, process 500 (e.g., as implemented on one or more system components as described in FIG. 3) determines a first command portion and a second command portion. For example, the system may determine a first command portion that is generated using a standardized process for the first set of attributes and a second command portion that is generated using a process selected based on the second set of attributes. For example, the system may determine characteristics about the attributes and/or assets and generate a command portion dynamically. For example, the system may determine a respective asset type identifier for each of the plurality of asset types. The system may input the respective asset type identifier into a database listing schemas corresponding to asset type identifiers to determine a respective set of database objects for each of the plurality of asset types.

Additionally or alternatively, the system may modify a command based on the schema. For example, the system may determine a modification to the second command portion based on the respective set of database objects. The system may then apply the modification to the second command portion prior to performing the first operation to the respective second set of attributes of the assets.

In some embodiments, command portions may be generated using one or more models. For example, the system may determine a command portion based on an output of a model used for predicting one or more operation terms. Furthermore, the system may dynamically update this model in an iterative process based on the results.

In some embodiments, the system may determine a command portion based on asset terminology. For example, the system may determine an asset terminology identifier based on the first operation. The system may then compare the asset terminology identifier to a database listing terminology for users performing the first operation to determine a modification to the second command portion. The system may then apply the modification to the second command portion prior to performing the first operation to the respective second set of attributes of the assets.

At step 510, process 500 (e.g., as implemented on one or more system components as described in FIG. 3) performs, based on the first command portion, the first operation. For example, the system may perform, based on the first command portion, the first operation to the respective first set of attributes of the assets.

At step 512, process 500 (e.g., as implemented on one or more system components as described in FIG. 3) performs, based on the second command portion, the first operation. For example, the system may perform, based on the second command portion, the first operation to the respective second set of attributes of the assets.

The system may perform the operation based on characteristics of the attributes and/or schema. In some embodiments, the system may select an algorithm based on the schema specific for processing the attributes. For example, the system may select a first algorithm based on the schema specific to the respective asset type of the plurality of asset types and the first operation. The system may then process each of the respective second set of attributes for the plurality of asset types using the first algorithm.

Additionally or alternatively, the system may determine a first data type for the schema specific to a first asset type of the plurality of asset types. The system may then format the second command portion based on the first data type to generate a first formatted command portion. The system may then compare the first formatted command portion to a first value of a first attribute of the second set of attributes for the first asset type. The system may then determine a second data type for the schema specific to a second asset type of the plurality of asset types. The system may then format the second command portion based on the second data type to generate a second formatted command portion. The system may then compare the second formatted command portion to a first value of a second attribute of the second set of attributes for the second asset type.

At step 514, process 500 (e.g., as implemented on one or more system components as described in FIG. 3) generates a result for the first operation. For example, the system may generate for display, on a user interface, a result for the first operation based on performing the first command portion and the second command portion. For example, the result may comprise one or more confirmations of the metadata corresponding to the assets that are validated.

In some embodiments, the system may receive a plurality of content published to an API based on the result. The system may then filter the plurality of content using a first user content subscription setting for the first user. Additionally or alternatively, the system may determine, based on a batch filtering criterion, a respective relevance ranking for a plurality of content related to the result. The system may then compare the respective relevance ranking to a respective threshold relevance ranking to determine whether to publish the content.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for validating non-homogenous assets that comprise non-standardized data descriptions using dynamically generated validation rules.
2. A method for executing operations across data exchanges that comprise non-homogenous assets and non-standardized data descriptions.
3. The method of any one of the preceding embodiments, further comprising: receiving, from a first user, a request to access a data exchange, wherein the data exchange comprises a plurality of assets with a plurality of respective asset types, wherein each of the plurality of asset types comprises a first set of attributes and a second set of attributes, wherein the first set of attributes each comprises a standardized schema, and wherein the second set of attributes each comprises a schema specific to a respective asset type of the plurality of respective asset types; receiving, from the first user, a first validation request for a first asset of the plurality of assets; determining a first validation rule for validating the data exchange, wherein the first validation rule comprises a first validation rule portion that is generated using a standardized validation process for the first set of attributes and a second validation rule portion that is generated using a validation process selected based on the second set of attributes; performing, based on the standardized schema, a first validation by applying the first validation rule portion to the respective first set of attributes for the plurality of asset types; performing, based on a schema specific to the respective asset type of the plurality of asset types, a second validation by applying the second validation rule portion to the respective second set of attributes for the plurality of asset types; and generating for display, on a user interface, a result for the first validation request based on the first validation and the second validation.
4. The method of any one of the preceding embodiments, wherein generating for display, on the user interface, the result for the first validation request comprises: receiving a plurality of content published to an application programming interface ("API") based on the result; and filtering the plurality of content using a first user content subscription setting for the first user.
5. The method of any one of the preceding embodiments, wherein generating for display, on the user interface, the result for the first validation request further comprises: determining, based on a batch filtering criterion, a respective relevance ranking for a plurality of content related to the result; and comparing the respective relevance ranking to a respective threshold relevance ranking to determine whether to publish the content.
6. The method of any one of the preceding embodiments, wherein performing, based on the schema specific to the respective asset type of the plurality of asset types further comprises: selecting a first validation algorithm based on the schema specific to the respective asset type of the plurality of asset types; and processing each of the respective second set of attributes for the plurality of asset types using the first validation algorithm.
7. The method of any one of the preceding embodiments, wherein performing, based on the schema specific to the respective asset type of the plurality of asset types, a second validation of the second validation rule portion to the respective second set of attributes for the plurality of asset types comprises: determining a first data type for the schema specific to a first asset type of the plurality of asset types; formatting the second validation rule portion based on the first data type to generate a first formatted validation rule portion; comparing the first formatted validation rule portion to a first value of a first attribute of the second set of attributes for the first asset type; determining a second data type for the schema specific to a second asset type of the plurality of asset types; formatting the second validation rule portion based on the second data type to generate a second formatted validation rule portion; and comparing the second formatted validation rule portion to a first value of a second attribute of the second set of attributes for the second asset type.

8. The method of any one of the preceding embodiments, wherein the validation process used to generate the second validation rule portion comprises: determining a respective asset type identifier for each of the plurality of asset types; and inputting the respective asset type identifier into a database listing schemas corresponding to asset type identifiers to determine a respective set of database objects for each of the plurality of asset types.

9. The method of any one of the preceding embodiments, wherein the validation process used to generate the second validation rule portion further comprises: determining a modification to the second validation rule portion based on the respective set of database objects; and applying the modification to the second validation rule portion prior to the second validation.

10. The method of any one of the preceding embodiments, wherein the first validation rule is further determined based on an output of a model used for predicting one or more validation rules, and wherein the model is updated based on the result.

11. The method of any one of the preceding embodiments, wherein the validation process used to generate the second validation rule portion comprises: determining an asset terminology identifier based on the second set of attributes; comparing the asset terminology identifier to a database listing terminology for assets with the second set of attributes to determine a modification to the second validation rule portion; and applying the modification to the second validation rule portion prior to the second validation.

12. The method of any one of the preceding embodiments, further comprising: determining a first authorization level for the first user based on the second set of attributes; and comparing the first authorization level to a database listing authorization levels corresponding to each of the plurality of asset types to validate the plurality of asset types based on the first authorization level.

13. The method of any one of the preceding embodiments, further comprising: determining a first role for the first user; and comparing the first role to a database listing roles likely to access each of the plurality of asset types to validate the plurality of asset types based on the first role.

14. The method of any one of the preceding embodiments, further comprising: determining a first set of attributes for performing the first validation based on the second set of attributes; and determining a second set of attributes for performing the second validation based on the second set of attributes.

15. The method of any one of the preceding embodiments, further comprising: determining a first attribute set identifier based on the second set of attributes; and comparing the first attribute set identifier to a database listing attribute sets corresponding to the first attribute set identifier to determine the first set of attributes for performing the first validation.

16. The method of any one of the preceding embodiments, further comprising: receiving, from a first user, a request to access a data exchange, wherein the data exchange comprises a plurality of asset types, wherein each of the plurality of asset types comprises a first set of attributes and a second set of attributes, wherein the first set of attributes each comprises a standardized schema, and wherein the second set of attributes each comprises a schema specific to a respective asset type of the plurality of asset types; receiving, from a first user, a first operation for applying to assets in the data exchange; generating a first command string based on the first operation, wherein the first command string identifies the assets upon which to perform the first operation; determining a first command portion that is generated using a standardized process for the first set of attributes and a second command portion that is generated using a process selected based on the second set of attributes; performing, based on the first command portion, the first operation to the respective first set of attributes of the assets; performing, based on the second command portion, the first operation to the respective second set of attributes of the assets; and generating for display, on a user interface, a result for the first operation based on performing the first command portion and the second command portion.

17. The method of any one of the preceding embodiments, wherein performing, based on the second command portion the first operation to the respective second set of attributes of the assets further comprises: selecting a first algorithm based on the schema specific to the respective asset type of the plurality of asset types and the first operation; and processing each of the respective second set of attributes for the plurality of asset types using the first algorithm.

18. The method of any one of the preceding embodiments, wherein performing, based on the second command portion the first operation to the respective second set of attributes for the plurality of asset types comprises: determining a first data type for the schema specific to a first asset type of the plurality of asset types; formatting the second command portion based on the first data type to generate a first formatted command portion; comparing the first formatted command portion to a first value of a first attribute of the second set of attributes for the first asset type; determining a second data type for the schema specific to a second asset type of the plurality of asset types; formatting the second command portion based on the second data type to generate a second formatted command portion; and comparing the second formatted command portion to a first value of a second attribute of the second set of attributes for the second asset type.

19. The method of any one of the preceding embodiments, wherein the process used to generate the second command portion comprises: determining a respective asset type identifier for each of the plurality of asset types; and inputting the respective asset type identifier into a database listing schemas corresponding to asset type identifiers to determine a respective set of database objects for each of the plurality of asset types.

20. The method of any one of the preceding embodiments, wherein the process used to generate the second input portion further comprises: determining a modification to the second command portion based on the respective set of database objects; and applying the modification to the second command portion prior to performing the first operation to the respective second set of attributes of the assets.

21. The method of any one of the preceding embodiments, wherein the first command is further determined based on an output of a model used for predicting one or more operation terms, and wherein the model is updated based on the result.
22. The method of any one of the preceding embodiments, wherein the process used to generate the second command portion comprises: determining an asset terminology identifier based on the first operation; comparing the asset terminology identifier to a database listing terminology for users performing the first operation to determine a modification to the second command portion; and applying the modification to the second command portion prior to performing the first operation to the respective second set of attributes of the assets.
23. The method of any one of the preceding embodiments, further comprising: determining a first authorization level for a first user; and comparing the first authorization level to a database listing authorization levels corresponding to each of a plurality of operation types to determine whether to generate the first command string.
24. The method of any one of the preceding embodiments, further comprising: determining a first role for a first user based on a first credential; and comparing the first role to a database listing roles corresponding to each of a plurality of operation types to determine whether to generate the first command string.
25. The method of any one of the preceding embodiments, further comprising: determining a first set of attributes for performing the first operation based on the first command string; and determining a second set of attributes for performing the first operation based on the first command string.
26. The method of any one of the preceding embodiments, further comprising: determining a first attribute set identifier based on the first command string; and comparing the first attribute set identifier to a database listing attribute sets corresponding to the first attribute set identifier to determine the first set of attributes for performing the first command string.
27. The method of any one of the preceding embodiments, wherein generating for display, on the user interface, the result for the first operation comprises: receiving a plurality of content published to an application programming interface ("API") based on the result; and filtering the plurality of content using a first user content subscription setting for the first user.
28. The method of any one of the preceding embodiments, wherein generating for display, on the user interface, the result for the first operation further comprises: determining, based on a batch filtering criterion, a respective relevance ranking for a plurality of content related to the result; and comparing the respective relevance ranking to a respective threshold relevance ranking to determine whether to publish the content.
29. A tangible, non-transitory, machine-readable medium storing instructions that, when executed by a data processing apparatus, cause the data processing apparatus to perform operations comprising those of any of embodiments 1-28.
30. A system comprising: one or more processors; and memory storing instructions that, when executed by the processors, cause the processors to effectuate operations comprising those of any of embodiments 1-28.
31. A system comprising means for performing any of embodiments 1-28.

What is claimed is:
1. A system for validating non-homogenous assets that comprise non-standardized data descriptions using dynamically generated validation rules, the system comprising:
one or more processors: and a non-transitory, computer-readable medium comprising instructions that when executed by the one or more processors causes operations comprising:
receiving, from a first user, a request to update a data exchange by adding a candidate asset comprising a first set of attribute values conforming to a standardized schema and a second set of attribute values conforming to an asset-specific schema, wherein the data exchange comprises a plurality of assets with a plurality of asset types, wherein each asset type of the plurality of asset types comprises values conforming to the standardized schema, and wherein the asset-specific schema comprises an asset function to retrieve outputs from an application programming interface (API);
retrieving an API validation requirement associated with the API indicating that an asset attribute is a valid input for an API database of the API;
receiving, from the first user, a first validation request for a first asset of the plurality of assets, the first validation request comprising an identifier for the asset function;
determining a validation rule for validating the data exchange by:
generating a sequence of identified search portions corresponding with the standardized schema by (1) searching text in the request to detect one or more portions corresponding with asset descriptions of the standardized schema to add to the sequence of identified search portions and (2) modifying one or more portions of the sequence of identified search portions based on a format associated with the standardized schema;
generating a first validation rule portion requiring that the sequence of identified search portions conforms with a first data format definition associated with the standardized schema; and
generating a second validation rule portion requiring that at least one attribute of the candidate asset satisfy the API validation requirement for the API database;
performing a first validation by applying the first validation rule portion to the first set of attribute values;
performing a second validation by applying the second validation rule portion to the second set of attribute values to determine whether an attribute value of the second set of attribute values is a valid input for the API database; and
updating the data exchange to add the candidate asset to the data exchange based on a result of the second validation.
2. A method for validating non-homogenous assets that comprise non-standardized data descriptions using dynamically generated validation rules, the method comprising:
receiving, from a first user, a request to update a data exchange by adding a candidate asset comprising a first set of attribute values conforming to a standardized schema and a second set of attribute values conforming to an asset-specific schema, wherein the data exchange comprises a plurality of assets with a plurality of asset types, wherein each asset type of the plurality of asset types comprises values conforming to the standardized schema, and wherein the asset-specific schema comprises an asset function to retrieve outputs from an application programming interface (API);

retrieving an API validation requirement associated with the API indicating that an asset attribute is a valid input for an API database of the API, receiving, from the first user, a first validation request for a first asset of the plurality of assets, the first validation request comprising an identifier for the asset function;

determining a validation rule for validating the data exchange by:

generating a sequence of identified search portions corresponding with the standardized schema by (1) searching text in the request to detect one or more portions corresponding with asset descriptions of the standardized schema to add to the sequence of identified search portions and (2) modifying one or more portions of the sequence of identified search portions based on a format associated with the standardized schema;

generating a first validation rule portion requiring that the sequence of identified search portions conforms with a first data format definition associated with the standardized schema; and generating a second validation rule portion requiring that at least one attribute of the candidate asset satisfy the API validation requirement for the API database;

performing a first validation by applying the first validation rule portion to the first set of attribute values;

performing a second validation by applying the second validation rule portion to the second set of attribute values to determine whether an attribute value of the second set of attribute values is a valid input for the API database; and updating the data exchange to add the candidate asset to the data exchange based on a result of the second validation.

3. The method of claim 2, wherein the API is a first API, and wherein generating for display, on a user interface, the result for the first validation request comprises:

receiving a plurality of content published to a second API based on the result; and filtering the plurality of content using a first user content subscription setting for the first user.

4. The method of claim 2, wherein generating for display, on a user interface, the result for the first validation request further comprises:

determining, based on a batch filtering criterion, a respective relevance ranking for a plurality of content related to the result; and comparing the respective relevance ranking to a respective threshold relevance ranking to determine whether to publish content of the plurality of content.

5. The method of claim 2, wherein performing at least one of the first validation or the second validation comprises:

selecting a first validation algorithm based on schema specific to a respective asset type of the plurality of asset types; and processing each of the respective second sets of attribute values for the plurality of asset types using the first validation algorithm.

6. The method of claim 2, wherein performing the second validation comprises:

determining a first data type for a first schema specific to a first asset type of the plurality of asset types;

formatting the second validation rule portion based on the first data type to generate a first formatted validation rule portion;

comparing the first formatted validation rule portion to a first value of a first attribute of the second set of attribute values for the first asset type;

determining a second data type for a second schema specific to a second asset type of the plurality of asset types;

formatting the second validation rule portion based on the second data type to generate a second formatted validation rule portion; and comparing the second formatted validation rule portion to a first value of a second attribute of the second set of attribute values for the second asset type.

7. The method of claim 2, wherein generating the second validation rule portion comprises:

determining a respective asset type identifier for each of the plurality of asset types; and inputting the respective asset type identifier into a database listing schemas corresponding to asset type identifiers to determine a respective set of database objects for each of the plurality of asset types.

8. The method of claim 7, wherein generating the second validation rule portion further comprises:

determining a modification to the second validation rule portion based on the respective set of database objects; and applying the modification to the second validation rule portion prior to the second validation.

9. The method of claim 2, wherein the validation rule is further determined based on an output of a model used for predicting one or more validation rules, and wherein the model is updated based on the result.

10. The method of claim 2, wherein generating the second validation rule portion comprises:

determining an asset terminology identifier based on the second set of attribute values;

comparing the asset terminology identifier to a database listing terminology for assets with the second set of attribute values to determine a modification to the second validation rule portion; and applying the modification to the second validation rule portion prior to the second validation.

11. The method of claim 2, further comprising:

determining a first authorization level for the first user based on the second set of attribute values; and comparing the first authorization level to a database listing authorization levels corresponding to each of the plurality of asset types to validate the plurality of asset types based on the first authorization level.

12. The method of claim 2, further comprising:

determining a first role for the first user; and comparing the first role to a database listing roles likely to access each of the plurality of asset types to validate the plurality of asset types based on the first role.

13. The method of claim 2, further comprising:

determining the first set of attribute values for performing the first validation based on the second set of attribute values; and determining the second set of attribute values for performing the second validation based on the second set of attribute values.

14. The method of claim 2, further comprising:

determining a first attribute set identifier based on the second set of attribute values; and comparing the first attribute set identifier to a database listing attribute sets corresponding to the first attribute set identifier to determine the first set of attribute values for performing the first validation.

15. A non-transitory, computer-readable medium comprising instructions that when executed by one or more processors causes operations comprising:

receiving, from a first user, a request to update a data exchange by adding a candidate asset comprising a first set of attribute values conforming to a standardized schema and a second set of attribute values conforming to an asset-specific schema, wherein the data exchange comprises a plurality of assets with a plurality of asset types, wherein each asset type of the plurality of asset types comprises values conforming to the standardized schema, and wherein the asset-specific schema comprises an asset function to retrieve outputs from an application programming interface (API);

retrieving an API validation requirement associated with the API indicating that an asset attribute is a valid input for an API database of the API;

receiving, from the first user, a first validation request for a first asset of the plurality of assets, the first validation request comprising an identifier for the asset function;

determining a validation rule for validating the data exchange by
generating a sequence of identified search portions corresponding with the standardized schema by (1) searching text in the request to detect one or more portions corresponding with asset descriptions of the standardized schema to add to the sequence of identified search portions and (2) modifying one or more portions of the sequence of identified search portions based on a format associated with the standardized schema;
generating a first validation rule portion requiring that the sequence of identified search portions conforms with a first data format definition associated with the standardized schema; and
generating a second validation rule portion requiring that at least one attribute of the candidate asset satisfy the API validation requirement for the API database;

performing a first validation by applying the first validation rule portion to the first set of attribute values;

performing a second validation by applying the second validation rule portion to the second set of attribute values to determine whether an attribute value of the second set of attribute values is a valid input for the API database; and updating the data exchange to add the candidate asset to the data exchange based on a result of the second validation.

16. The non-transitory, computer-readable medium of claim 15, wherein generating for display, on a user interface, wherein the API is a first API, the result for the first validation request comprises:
receiving a plurality of content published to a second API based on the result; and
filtering the plurality of content using a first user content subscription setting for the first user.

17. The non-transitory, computer-readable medium of claim 15, wherein generating for display, on a user interface, the result for the first validation request further comprises:
determining, based on a batch filtering criterion, a respective relevance ranking for a plurality of content related to the result; and
comparing the respective relevance ranking to a respective threshold relevance ranking to determine whether to publish the content.

18. The non-transitory, computer-readable medium of claim 15, wherein performing at least one of the first validation or the second validation comprises:
selecting a first validation algorithm based on schema specific to a respective asset type of the plurality of asset types; and
processing each of the respective second set of attribute values for the plurality of asset types using the first validation algorithm.

19. The non-transitory, computer-readable medium of claim 15, wherein performing the second validation comprises:
determining a first data type for schema specific to a first asset type of the plurality of asset types;
formatting the second validation rule portion based on the first data type to generate a first formatted validation rule portion;
comparing the first formatted validation rule portion to a first value of a first attribute of the second set of attribute values for the first asset type;
determining a second data type for schema specific to a second asset type of the plurality of asset types;
formatting the second validation rule portion based on the second data type to generate a second formatted validation rule portion; and
comparing the second formatted validation rule portion to a first value of a second attribute of the second set of attribute values for the second asset type.

20. The non-transitory, computer-readable medium of claim 15, wherein generating the second validation rule portion comprises:
determining a respective asset type identifier for each of the plurality of asset types; and
inputting the respective asset type identifier into a database listing schemas corresponding to asset type identifiers to determine a respective set of database objects for each of the plurality of asset types.

* * * * *